(12) United States Patent
Adams

(10) Patent No.: US 9,599,535 B2
(45) Date of Patent: Mar. 21, 2017

(54) METHOD AND APPARATUS FOR EXCITATION OF GEAR RATTLE

(71) Applicant: GM GLOBAL TECHNOLOGY OPERATIONS LLC, Detroit, MI (US)

(72) Inventor: William K. Adams, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 136 days.

(21) Appl. No.: 14/716,174

(22) Filed: May 19, 2015

(65) Prior Publication Data
US 2016/0341632 A1  Nov. 24, 2016

(51) Int. Cl.
G01M 13/02  (2006.01)

(52) U.S. Cl.
CPC ........ G01M 13/021 (2013.01); G01M 13/028 (2013.01)

(58) Field of Classification Search
None
See application file for complete search history.

(56) References Cited

U.S. PATENT DOCUMENTS

| | | | | |
|---|---|---|---|---|
| 4,498,335 A | * | 2/1985 | Thoma | G01M 13/021 33/501.9 |
| 5,307,676 A | * | 5/1994 | Gutman | G01M 13/021 269/71 |
| 5,728,938 A | * | 3/1998 | Choi | G01M 13/028 73/162 |
| 7,742,899 B2 | | 6/2010 | Lemont, Jr. et al. | |
| 2002/0078742 A1 | * | 6/2002 | Kim | G01M 13/021 73/162 |
| 2015/0013449 A1 | * | 1/2015 | Murata | G01B 21/20 73/162 |
| 2015/0066390 A1 | * | 3/2015 | Chen | G01M 13/021 702/35 |
| 2015/0088435 A1 | * | 3/2015 | Isom | G01M 13/021 702/35 |
| 2015/0330867 A1 | * | 11/2015 | Potts | G01M 13/028 73/593 |
| 2015/0369699 A1 | * | 12/2015 | Chen | G01M 13/045 73/593 |
| 2016/0223430 A1 | * | 8/2016 | Yasui | G01M 13/021 |
| 2016/0282225 A1 | * | 9/2016 | Teramoto | G01M 13/045 |

* cited by examiner

*Primary Examiner* — Andre Allen
(74) *Attorney, Agent, or Firm* — Quinn Law Group, PLLC

(57) ABSTRACT

A test apparatus for eliciting a gear rattle from a gear-train employed in a device includes a fixture configured to support the device in a fixed starting position. The test apparatus also includes a tie-rod operatively connected to the device. Additionally, the test apparatus includes a controller configured to command the tie-rod to apply to the device at the starting position a force event defined by a mathematical function continuous in time. The force event is configured to elicit the gear-train rattle from the gear-train. A method for eliciting a gear rattle from a gear-train employed in a device is also disclosed.

20 Claims, 3 Drawing Sheets

METHOD AND APPARATUS FOR EXCITATION OF GEAR RATTLE

TECHNICAL FIELD

The present disclosure relates to a method and apparatus for excitation of gear rattle in a gear-train.

BACKGROUND

A gear-train is a mechanical system formed by mounting a plurality of gears on a frame so that the teeth of the gears engage. Gear teeth are generally designed to ensure that the pitch circles of engaging gears roll on each other without slipping, thereby providing a smooth transmission of motion from one gear to the next. The ratio of the pitch circles of mating gears defines the speed ratio and the mechanical advantage of the gear set. The simplest example of a gear-train has two gears. The input gear, also known as the drive gear, transmits power to the output gear, also known as the driven gear. The drive gear will typically be connected to a power source, such as a motor or an engine. In such an example, the torque or force output of the driven gear depends on the ratio of the dimensions of the two gears.

Gear rattle is an acoustic disturbance generated by a gear-train as a result of dynamic behavior of constituent gears. Generally, gear rattle is a result of an excitation force, such as angular speed fluctuations imparted to the input gear or an external input force applied to the frame that mounts the gear-train, and profile errors of the gear teeth. Tooth profile errors are typically an unavoidable consequence of the underlying gear manufacturing process. The tooth profile errors frequently result in increased gear lash, which can lead to repeated impacts and rebounds of meshed gear teeth. Typically, gear rattle is generated by such repeated impacts and rebounds of the meshed gear teeth, and is especially common in unloaded or lightly loaded gears. Gear rattle can be affected and dissipated or produced by the bearings that support the gears and respective gear lubrication conditions.

SUMMARY

A test apparatus for eliciting a gear rattle from a gear-train employed in a device includes a fixture configured to support the device in a fixed starting position. The test apparatus also includes a tie-rod operatively connected to the device. Additionally, the test apparatus includes a controller configured to command the tie-rod to apply to the device at the starting position a force event defined by a mathematical function continuous in time. The force event is configured to elicit the gear-train rattle from the gear-train.

The force event applied to the device may result in zero-net impulse applied to the device and to the test apparatus, such that the test apparatus is returned to the starting position and left at rest following each application of the force event to the device.

The force event defined by the mathematical function may have a profile of a Ricker Wavelet.

The controller may be additionally configured to vary the mathematical function to thereby adjust an apply rate of the force event and operatively bracket the elicited gear rattle.

The test apparatus may also include a first sensor configured to detect acceleration of the device following, and as a result of, the application of the force event to the device. The first sensor may additionally communicate the detected acceleration to the controller.

The test apparatus may additionally include a second sensor configured to detect a strain on the device as a result of the application of the force event to the device and communicate the detected strain to the controller.

The test apparatus may also include a microphone configured to acoustically detect the elicited gear rattle via the microphone and communicate the acoustically detected elicited gear rattle to the controller.

The test apparatus may additionally include a loudspeaker and a monitor operatively connected to the controller and configured to visually display the detected acceleration of the device along with the detected elicited gear rattle, and audibly reproduce the acoustically detected elicited gear rattle via the loudspeaker.

The test apparatus may also include an actuator, such as an electro-magnetic shaker, operatively connected to the tie-rod and configured to generate the force event.

The subject device may be a steering mechanism for a vehicle.

A method for eliciting a gear rattle from a gear-train employed in a device is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
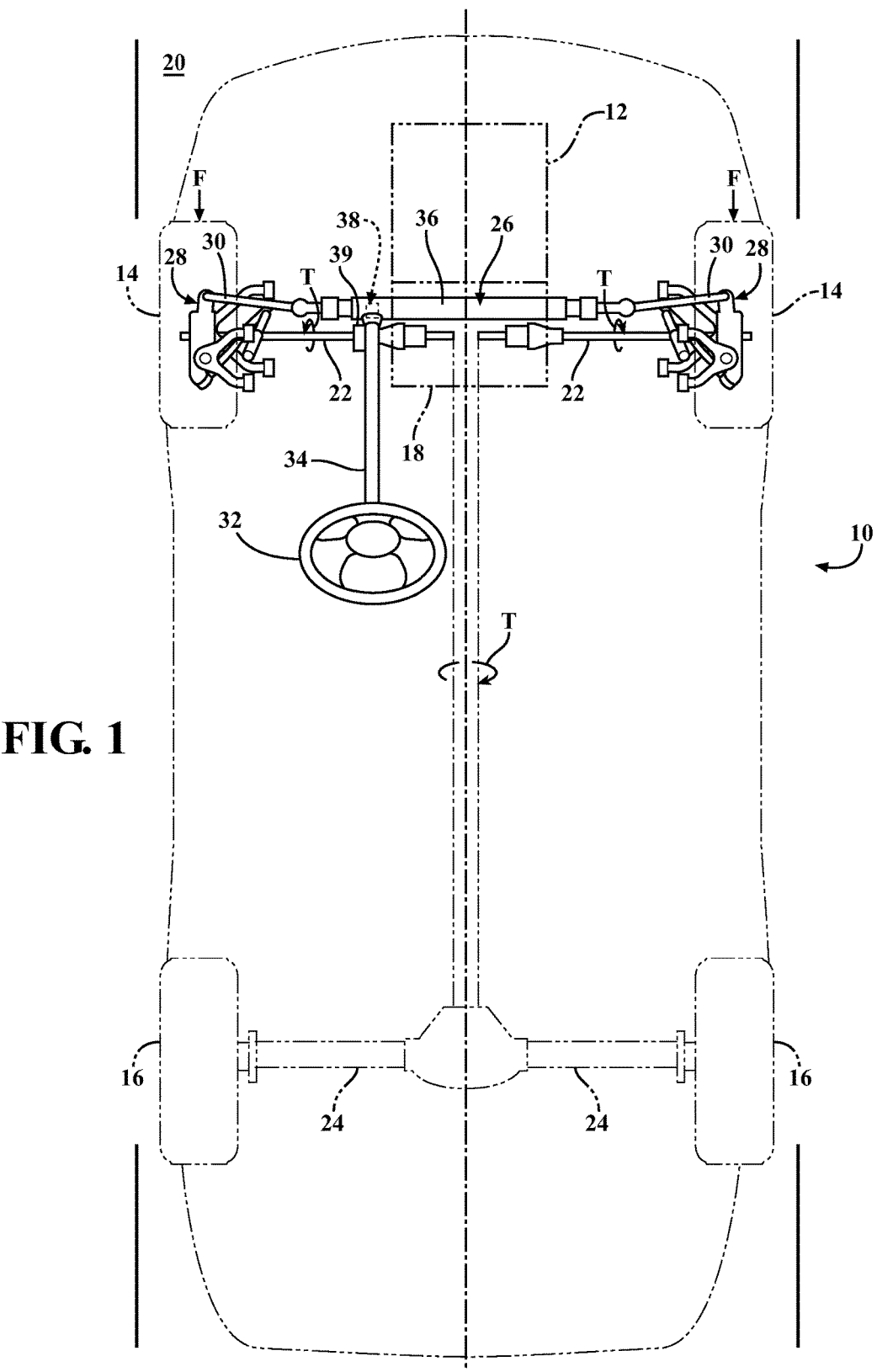
FIG. 1 is a schematic depiction of a typical vehicle having a steering mechanism employing a gear-train according to the disclosure.

Referring to the drawings, wherein like reference numbers refer to like components throughout the several views, FIG. 1 shows a schematic view of a motor vehicle 10. The vehicle 10 includes a power-source 12, such as an internal combustion engine, that generates output torque T. The power-source 12 is operatively connected to road wheels 14 and/or road wheels 16 through a transmission assembly 18 and drive-axles 22 and/or 24 in order to transmit the output torque T to a road surface 20 and provide propulsion for the vehicle 10.

As shown, the vehicle 10 also includes a steering mechanism 26, such as a steering rack, configured to control a direction of the vehicle via turning road wheels 14. The steering mechanism 26 is configured to turn the road wheels 14 by rotating steering knuckles 28 via a linkage 30 in response to an input from an operator of the vehicle 10 at a steering wheel 32. As understood by those skilled in the art, the steering mechanism 26 typically converts rotational motion of the steering wheel 32 connected to the steering mechanism 26 via a steering shaft 34 into linear motion needed to turn the road wheels 14. The steering mechanism 26 may also provide a gear reduction, making it easier for the vehicle operator to turn the road wheels 14. Although FIG. 1 shows the road wheels 14 being both driven by the power-source 12 and turned by the steering mechanism 26, a vehicle architecture where only the road wheels 14 are steered, while only the road wheels 16 are driven, is also envisioned. The steering mechanism 26 includes a steering housing 36 that supports and accommodates a gear-train 38. The gear-train 38 includes a plurality of intermeshed gears 38A, shown schematically in FIG. 2, that establish a speed ratio and a mechanical advantage for the steering mechanism 26.

Typically, the road surface 20 is seldom perfectly smooth. Consequently, as the vehicle traverses the road surface 20, a certain amount of road impact energy is created at the points at which the road wheels 14 contact the road surface 20. As a result, road imperfections provide an excitation force F that is channeled into the steering mechanism 26 via the road wheels 14. Such road impact energy generally travels through the road wheels 14, the steering knuckles 28, the linkage 30, the steering housing 36, and a steering-effort assist device 39, if such is included. The road impact energy may cause high bi-directional acceleration of intermeshed gears 38A in the gear-train 38 and result in an audible noise, commonly known as gear rattle.

Intermeshed gears 38A typically exhibit tooth variation and errors in the profile that are an unavoidable consequence of the underlying manufacturing process and tooling used to make the gears. The teeth profile variations and errors of the intermeshed gears 38A frequently result in increased gear lash in the gear-train 38. Such gear lash can lead to repeated impacts and rebounds of meshed gear teeth 38A when excited by the force F as the vehicle 10 traverses the road surface 20, and generate an acoustic disturbance known as gear rattle. Gear-rattle in the gear-train 38 is, therefore, a dynamic response of the gear-train that generally varies with the magnitude of the excitation force F.

Figure 2:
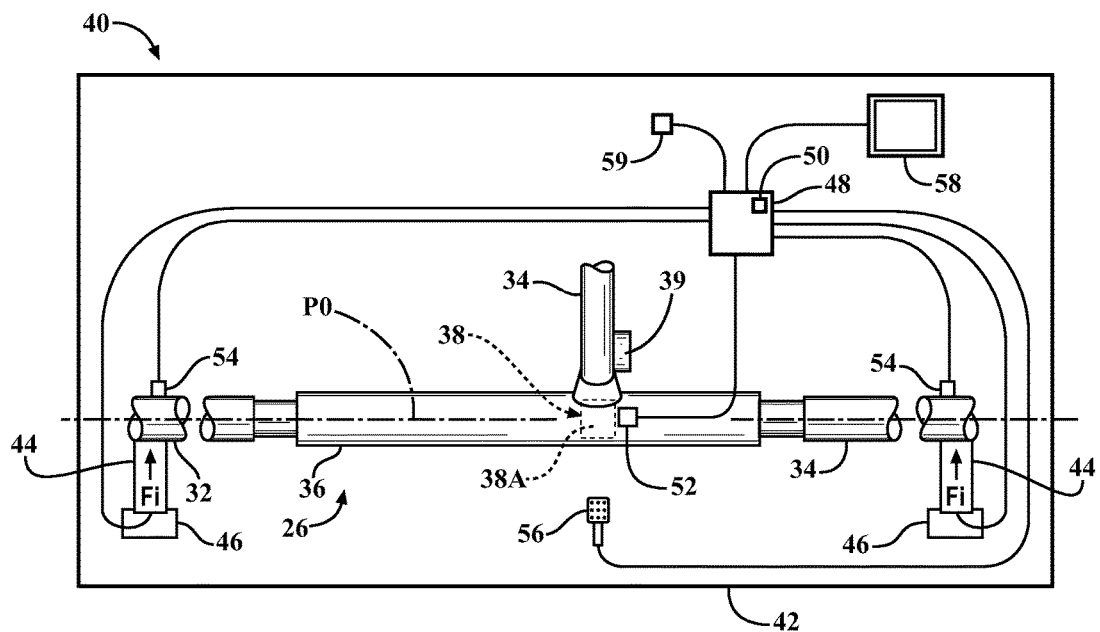
FIG. 2 is a close up schematic top view of the steering mechanism shown in FIG. 1, illustrating the steering mechanism arranged on a fixture of a test apparatus.

For the purpose of development of the steering mechanism 26 and specifically for the reduction of gear rattle, it may be desirable to reproduce and verify during controlled laboratory conditions dynamic response of the gear-train 38 that the gear-train exhibits during real-world operation in the vehicle 10. As shown in FIG. 2, a test apparatus 40 is configured for eliciting gear rattle from a gear-train, e.g., gear-train 38, employed by a device, such as the steering mechanism 26. Although the test apparatus 40 may be configured to accept another device employing any gear-train conceptually similar to the gear-train 38, for simplicity, the present disclosure will primarily describe the test apparatus with respect to the steering mechanism 26. It should be readily understood, however, that the disclosed test apparatus 40 may be employed for laboratory testing and specifically for eliciting gear rattle in other devices employing a gear-train similar to the gear-train 38, whether used in the automotive or other industries.

The test apparatus 40 includes a fixture or test stand 42 configured to support the steering mechanism 26 in a fixed starting or initial position P0. The test apparatus 40 also includes a tie-rod 44 operatively connected to the steering mechanism 26. The test apparatus 40 additionally includes an actuator 46 operatively connected to the tie-rod and configured to generate a force event, such as a force pulse, Fi. The actuator 46 may be configured as an electro-magnetic shaker or other force input device sufficient to generate a repeated force event Fi to the steering mechanism 26 or any other device employing a gear-train, similar to the gear-train 38. As shown in FIG. 2, the test apparatus 40 also includes a controller 48 configured to operate the actuator 46 and apply via the tie-rod 44 the force event Fi to the steering mechanism 26. The force event Fi is applied to the steering mechanism 26 at the starting position P0 and is intended to represent the excitation force F generally experienced by the steering mechanism as the vehicle 10 traverses the road surface 20.

The force event Fi can be applied at any angle with respect to the steering mechanism 26, such as matching an actual angle of the application of force F to the steering mechanism in the vehicle 10 or co-axially with respect to the steering housing 36. The force event Fi is configured to elicit the gear-train rattle from the gear-train 38 and is defined by a mathematical function 50 that is continuous in time. The force event Fi is configured to result in zero-net impulse applied to the steering mechanism 26 and to the test apparatus 40, such that the test apparatus is returned to the starting position P0 and left at rest, i.e., with no residual force acting thereon, following each application of the force event to the steering mechanism.

The controller 48 may be configured as a personal computer and includes a memory that is tangible and non-transitory. The memory may be any recordable medium that participates in providing computer-readable data or process instructions. Such a medium may take many forms, including but not limited to non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to the processor. Memory of the controller 48 may also include a floppy disk, a flexible disk, hard disk, magnetic tape, any other magnetic medium, a CD-ROM, DVD, any other optical medium, etc. The controller 48 can be configured or equipped with other required computer hardware, such as a high-speed clock, requisite Analog-to-Digital (A/D) and/or Digital-to-Analog (D/A) circuitry, any necessary input/output circuitry and devices (I/O), as well as appropriate signal conditioning and/or buffer circuitry. Any algorithms required by the controller 48 or accessible thereby may be stored in the memory and automatically executed to provide the required functionality.

Figure 3:
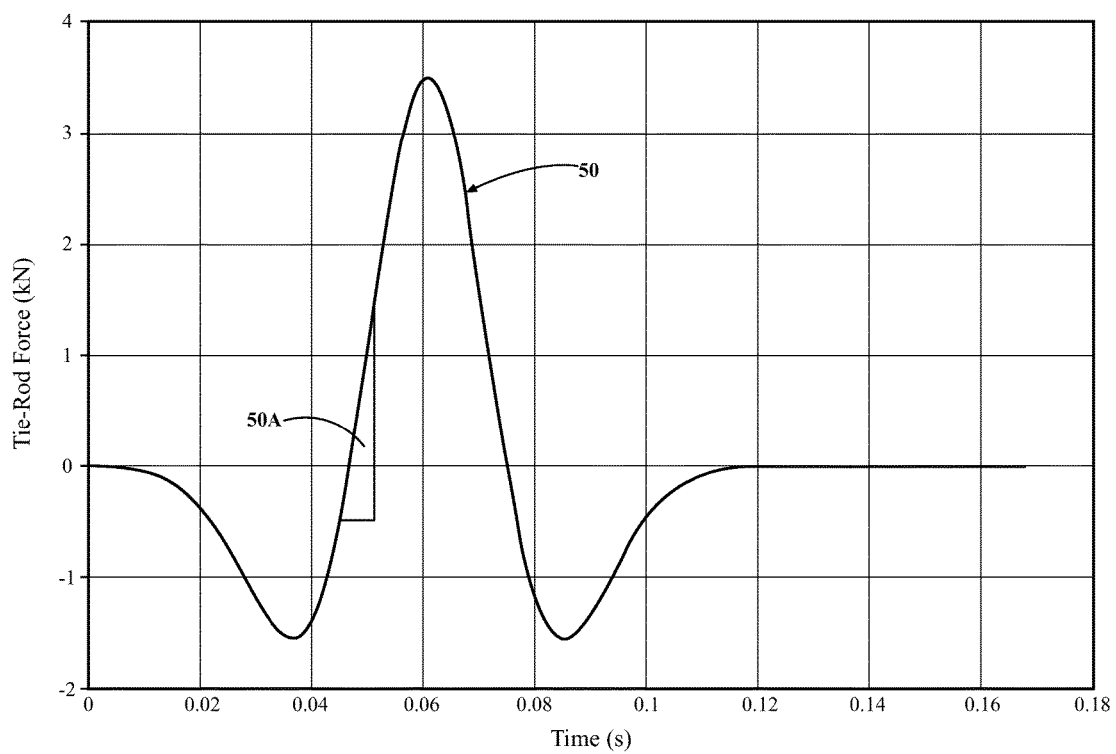
FIG. 3 is a graphical plot of a representative Ricker Wavelet force event according to the disclosure.

The mathematical function 50 defining the force event Fi may have a profile of a Ricker Wavelet, as shown in FIG. 3. In mathematics and numerical analysis the Ricker Wavelet is the negative normalized second derivative of a Gaussian function, i.e., up to scale and normalization, the second I-Termite function. The Ricker Wavelet is a particular case of a family of continuous wavelets, i.e., wavelets used in a continuous wavelet transform known as Hermitian wavelets. Mathematically, the Ricker Wavelet is generally expressed as:

$$\psi(t) = \frac{2}{\sqrt{3\sigma}\,\pi^{\frac{1}{4}}}\left(1 - \frac{t^2}{\sigma^2}\right)e^{\frac{-t^2}{2\sigma^2}}$$

In the subject expression, $\psi(t)$ represents the Ricker Wavelet as a function of time.

The controller 48 may be additionally configured to vary the mathematical function 50 to thereby adjust a target apply rate 50A (shown in FIG. 3) of the force event Fi to the steering mechanism 26 via the tie-rod 44. Such adjustment of the apply rate 50A of the force event Fi is intended to vary the excitation of the gear-train 38 in order to operatively "bracket" the elicited gear rattle. In other words, the controller 48 can be programmed to vary parameters of the mathematical function 50 in order to establish the target apply rate 50A of the force event Fi at which the gear-train 38 just starts to exhibit audible gear rattle. The target apply rate 50A of the force event Fi may vary with a specific application or usage of the device employing the gear-train 38, such as with a particular vehicle 10. Accordingly, the target apply rate 50A of the force event Fi may be obtained from road measurements of a vehicle similar to the vehicle 10 or via an appropriate empirical simulation.

There may be a number of reasons to bracket the target apply rate 50A. One of such reasons can be that the apply rate commanded by the controller 48 is not reproduced precisely by the test apparatus 40. In such a case, the noise response from the gear-train 38 in the steering mechanism 26 can be estimated by interpolating to the target apply rate 50A, and, therefore, should be bracketed or covered by force events actually achieved in a particular test series. Another reason for bracketing the target apply rate 50A could be to account for the possibility that the target apply rate 50A of the force event Fi could change in a particular vehicle architecture due to commonly fluctuating variables, such as tire inflation pressure, or other easily modifiable factors such as tire size or mass of a particular vehicle. In the event that the range of the test apply rates still brackets the new target apply rate 50A, noise response from the gear-train 38 for the revised vehicle architecture could be estimated from previously conducted tests, and no additional testing would then be required.

The test apparatus 40 may also include a first sensor 52 configured to detect acceleration of the steering mechanism 26 as a result of the application of the force event Fi to the steering mechanism and communicate the detected acceleration to the controller 48. The test apparatus 40 may also include a second sensor 54 configured to detect a strain on the device as a result of the application of the force event Fi to the steering mechanism 26 and communicate the detected strain to the controller 48. Accordingly, the second sensor may permit the controller to verify the magnitude of the force event Fi in comparison to the excitation force F generally experienced by the steering mechanism 26 as the vehicle 10 traverses the road surface 20. The test apparatus 40 may also include a microphone 56 configured to acoustically detect the elicited gear rattle and communicate the detected elicited gear rattle to the controller 48.

The test apparatus 40 may also include a monitor 58 operatively connected to the controller 48 and configured to visually display the detected acceleration of the steering mechanism 26 along with the elicited gear rattle acoustically detected by the microphone 56. The controller 48 may be programmed to generate a visual representation, such as in chart or table form, of the gear rattle elicited from the gear-train 38 as a function of varied force event Fi. In turn, the monitor 58 may permit a visual comparison of different apply rates 50A of the force event Fi, and how these experimental apply rates affect audible gear-rattle of the gear-train 38 as detected by the microphone 56. The test apparatus 40 may also include a loudspeaker 59 operatively connected to the controller 48 and configured to audibly reproduce the acoustically detected elicited gear rattle. As an additional benefit, the test apparatus 40 may permit verification of efficacy of various design iterations of the steering mechanism 26 and the gear-train 38 itself without the need to perform testing in the actual vehicle 10 for every new redesign.

Figure 4:
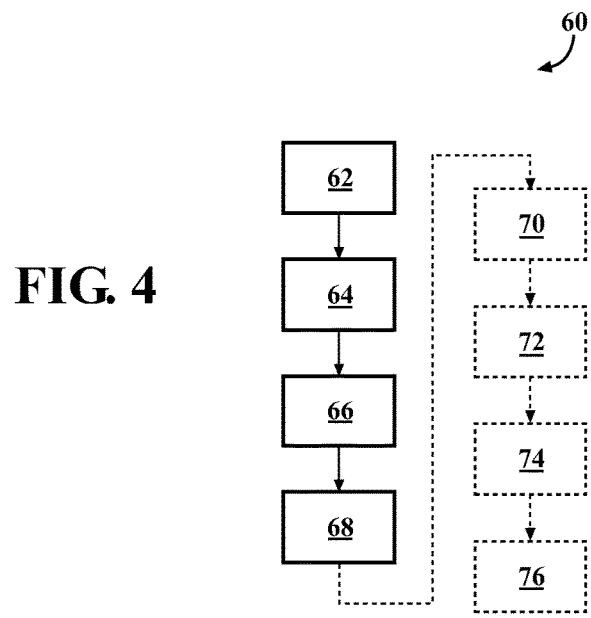
FIG. 4 is a flow diagram of a method used to elicit a gear rattle from the gear-train in the steering mechanism shown in FIGS. 1-2.

FIG. 4 depicts a method 60 of eliciting a gear rattle from the gear-train 38, as described above with respect to FIGS. 1-3. As described above, the gear-train 38 may be employed by a device, such as the steering mechanism 26. The method 60 commences in frame 62 with providing the test apparatus 40 having the fixture 42, the tie-rod 44, and the controller 48. Following frame 62, the method advances to frame 64. In frame 64 the method includes supporting the device having the gear-train 38 in the fixed starting position P0 via the fixture 42. After frame 64, the method advances to frame 66. In frame 66 the method includes operatively connecting the tie-rod 44 to the device, for example at the steering housing 36 that supports and accommodates the gear-train 38.

Following frame 66, the method proceeds to frame 68, where the method includes applying to the device at the starting position P0 the force event Fi defined by the mathematical function 50, to thereby elicit the gear-train rattle from the gear-train 38. As described above with respect to FIGS. 1-3, the controller 48 is programmed with the mathematical function 50 to elicit the gear-train rattle from the gear-train 38 by applying the force event Fi to the steering housing 36 via the tie-rod 44. The force event Fi is configured to apply a zero-net impulse to the device and includes returning the test apparatus 40 to the starting position P0. Accordingly, after each application of the force event Fi to the device has concluded, the test apparatus 40 is left at rest. As also described above, the mathematical function 50 may have a profile of a Ricker Wavelet.

In frame 68 the method may include varying via the controller 48 the mathematical function 50 to thereby adjust an apply rate of the force event Fi in order to operatively bracket the elicited gear rattle, as described above with respect to FIGS. 1-3. Following frame 68, the method may advance to frame 70. In frame 70 the method includes detecting via the first sensor 52 an acceleration of the device as a result of the application of the force event Fi to the device and communicating the detected acceleration via the first sensor to the controller 48. After frame 70, the method may proceed to frame 72. In frame 72 the method includes detecting via the second sensor 54 a strain on the device as a result of the application of the force event Fi to the device and communicating the detected strain via the second sensor to the controller 48.

Following frame 72, the method may advance to frame 74. In frame 74 the method includes acoustically detecting the elicited gear rattle via the microphone 56 and communicating the detected elicited gear rattle from the microphone to the controller 48. Following frame 74, the method may advance to frame 76. In frame 76 the method includes visually displaying the detected acceleration of the device along with the detected elicited gear rattle using the monitor 58. In frame 76 the method may also include acoustically detecting the elicited gear rattle via the microphone 56 and communicating the acoustically detected elicited gear rattle to the controller 48. Additionally, in frame 76 the method may include visually displaying the detected acceleration of the device along with the detected elicited gear rattle via the monitor 58, and audibly reproducing the acoustically detected elicited gear rattle via the loudspeaker 59. Overall, the method 60 may permit analysis of gear rattle in the gear-train 38 employed in a device such as the steering mechanism 26 and verification of various design iterations in a controlled laboratory setting.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A test apparatus for eliciting a gear rattle from a gear-train employed in a device, the apparatus comprising:
    a fixture configured to support the device in a fixed starting position;
    a tie-rod operatively connected to the device; and
    a controller configured to command the tie-rod to apply to the device at the starting position a force event defined by a mathematical function continuous in time, wherein the force event (impulse) is configured to elicit the gear-train rattle from the gear-train.

2. The test apparatus according to claim 1, wherein the force event applied to the device results in a zero-net impulse applied to the device and to the test apparatus, such that the test apparatus is returned to the starting position and left at rest following each application of the force event to the device.

3. The test apparatus of claim 2, wherein the force event defined by the mathematical function has a profile of a Ricker Wavelet.

4. The test apparatus according to claim 1, wherein the controller is additionally configured to vary the mathematical function to thereby adjust an apply rate of the force event and operatively bracket the elicited gear rattle.

5. The test apparatus according to claim 1, further comprising a first sensor configured to detect acceleration of the device as a result of the application of the force event to the device and communicate the detected acceleration to the controller.

6. The test apparatus according to claim 5, further comprising a second sensor configured to detect a strain on the device as a result of the application of the force event to the device and communicate the detected strain to the controller.

7. The test apparatus according to claim 5, further comprising a microphone configured to acoustically detect the elicited gear rattle and communicate the acoustically detected elicited gear rattle to the controller.

8. The test apparatus according to claim 7, further comprising:
    a monitor operatively connected to the controller and configured to visually display the detected acceleration of the device along with the detected elicited gear rattle; and
    a loudspeaker configured to audibly reproduce the acoustically detected elicited gear rattle.

9. The test apparatus according to claim 1, further comprising an actuator operatively connected to the tie-rod and configured to generate the force event.

10. The test apparatus according to claim 1, wherein the device is a steering mechanism for a vehicle.

11. A method for eliciting a gear rattle from a gear-train employed in a device, the method comprising:
    providing a test apparatus having a fixture, a tie-rod, and a controller;
    supporting the device in a fixed starting position via the fixture;
    operatively connecting the tie-rod to the device; and
    commanding the tie-rod, via the controller, to apply to the device at the starting position a force event defined by a mathematical function continuous in time, to thereby elicit the gear-train rattle from the gear-train.

12. The method according to claim 11, wherein said applying the force event to the device applies a zero-net impulse to the device and to the test apparatus, and includes returning the test apparatus to the starting position and leaving the test apparatus at rest following each application of the force event to the device.

13. The method of claim 12, wherein the force event defined by the mathematical function has a profile of a Ricker Wavelet.

14. The method according to claim 11, further comprising varying via the controller the mathematical function to thereby adjust an apply rate of the force event and operatively bracket the elicited gear rattle.

15. The method according to claim 11, further comprising detecting via a first sensor an acceleration of the device as a result of said applying the force event to the device and communicating the detected acceleration via the first sensor to the controller.

16. The method according to claim 15, further comprising detecting via a second sensor a strain on the device as a result of said applying the force event to the device and communicating the detected strain via the second sensor to the controller.

17. The method according to claim 15, wherein the test apparatus additionally includes a microphone, the method further comprising acoustically detecting the elicited gear rattle using the microphone and communicating the acoustically detected elicited gear rattle to the controller.

18. The method according to claim 17, further comprising a monitor and a loudspeaker, each operatively connected to the controller, the method further comprising visually displaying the detected acceleration of the device along with the detected elicited gear rattle via the monitor, and audibly reproducing the acoustically detected elicited gear rattle via the loudspeaker.

19. The method according to claim 11, wherein the test apparatus additionally includes an actuator operatively connected to the tie-rod, the method further comprising generating the force event via the actuator.

20. The method according to claim 11, wherein the device is a steering mechanism for a vehicle.

* * * * *